Figure 1:
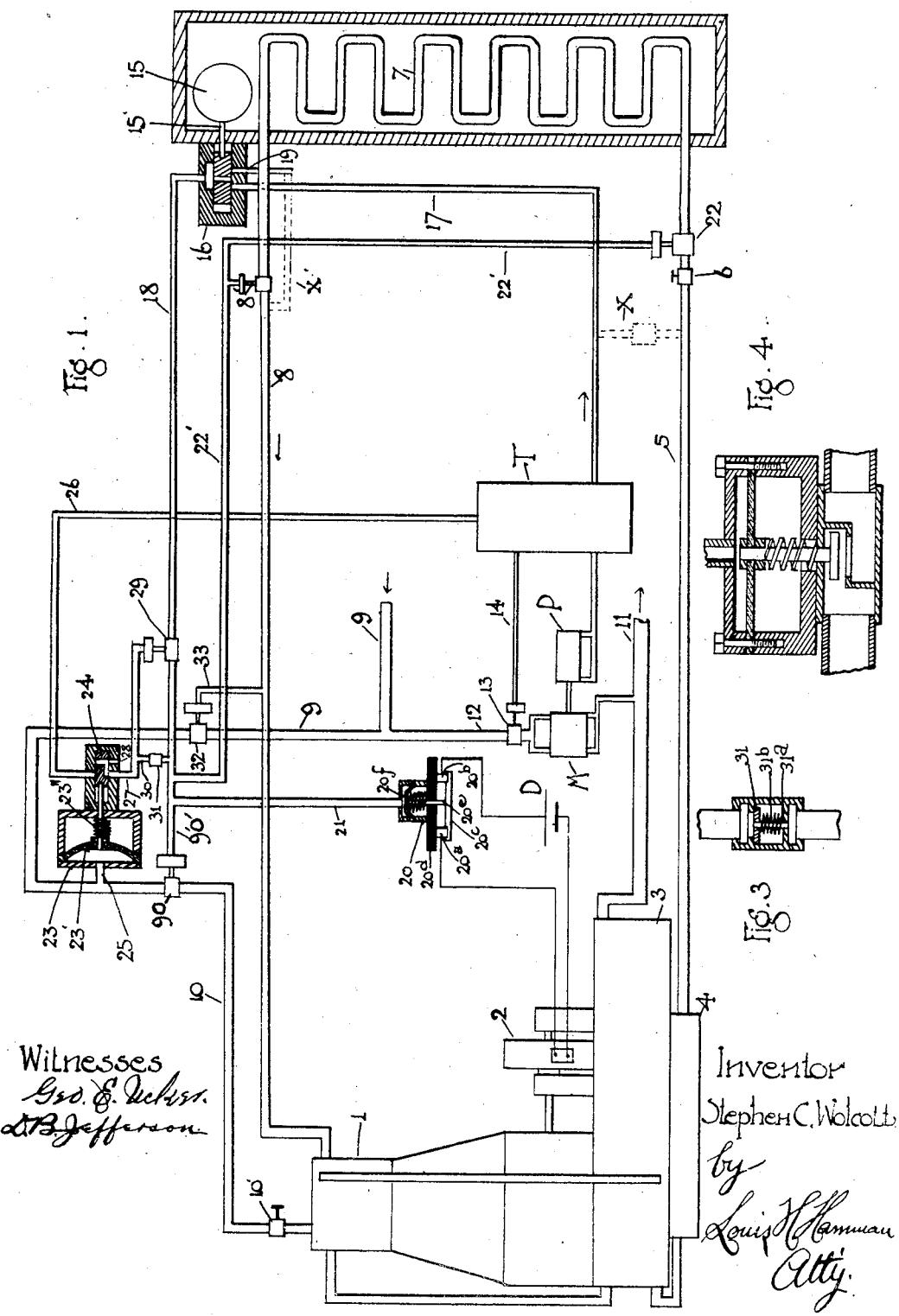

No. 686,874. Patented Nov. 19, 1901.
S. C. WOLCOTT.
AUTOMATIC REFRIGERATING APPARATUS.
(Application filed Dec. 22, 1900.)
(No Model.) 2 Sheets—Sheet 1.

Witnesses
Inventor
Stephen C. Wolcott
by
Louis H. Hamman
Atty.

No. 686,874. Patented Nov. 19, 1901.
S. C. WOLCOTT.
AUTOMATIC REFRIGERATING APPARATUS.
(Application filed Dec. 22, 1900.)
(No Model.) 2 Sheets—Sheet 2.

Witnesses
Inventor
Stephen C. Wolcott.

UNITED STATES PATENT OFFICE.

STEPHEN C. WOLCOTT, OF BRIDGEPORT, CONNECTICUT.

AUTOMATIC REFRIGERATING APPARATUS.

SPECIFICATION forming part of Letters Patent No. 686,874, dated November 19, 1901.

Application filed December 22, 1900. Serial No. 40,746. (No model.)

*To all whom it may concern:*

Be it known that I, STEPHEN C. WOLCOTT, a citizen of the United States, and a resident of Bridgeport, in the county of Fairfield and State of Connecticut, have invented certain new and useful Improvements in Automatic Refrigerating Apparatus, of which the following is a specification.

This invention relates to an improved means for automatically regulating a refrigerating apparatus or ice-machine, so that the temperature of the brine-tank of the ice-machine or the temperature of a room or a number of rooms in a cold-storage apparatus or refrigerator may be maintained substantially constant without the care or oversight of an attendant.

My invention consists of a means which is adapted to automatically control the starting or stopping of the motor which drives the compressing apparatus by fluid-pressure, the flow of which through the various pipes which are provided therefor being controlled by a thermostat, which is suitably located in the space which is to be refrigerated, the parts being arranged so that the motor is automatically stopped when the temperature falls too low in the refrigerated space and is automatically started again when the temperature rises above the point desired.

My invention further consists in the employment of the same means which controls the motor to automatically open and close the pipe which supplies the water for cooling the refrigerating medium as it is compressed simultaneously with the starting and stopping of the motor, so that the water will not be wasted while the motor is at rest.

My invention further consists in providing a means for automatically stopping the motor in case the water-supply should fail for any cause.

My invention further consists in providing means which enable a single motor and compressor to automatically maintain the temperatures at different points in a series of refrigerating-chambers, so that the motor and water-supply will be stopped when the temperatures in all the refrigerating-chambers have been brought down to the desired points, but will be started when the temperature in any one of the chambers is raised above the point desired in that particular chamber.

I accomplish the above results by means of automatic valves and switches which are operated by fluid-pressure, the flow of the latter being controlled by thermostats, which are arranged in the space to be refrigerated or in the brine-tank.

Figure 2:
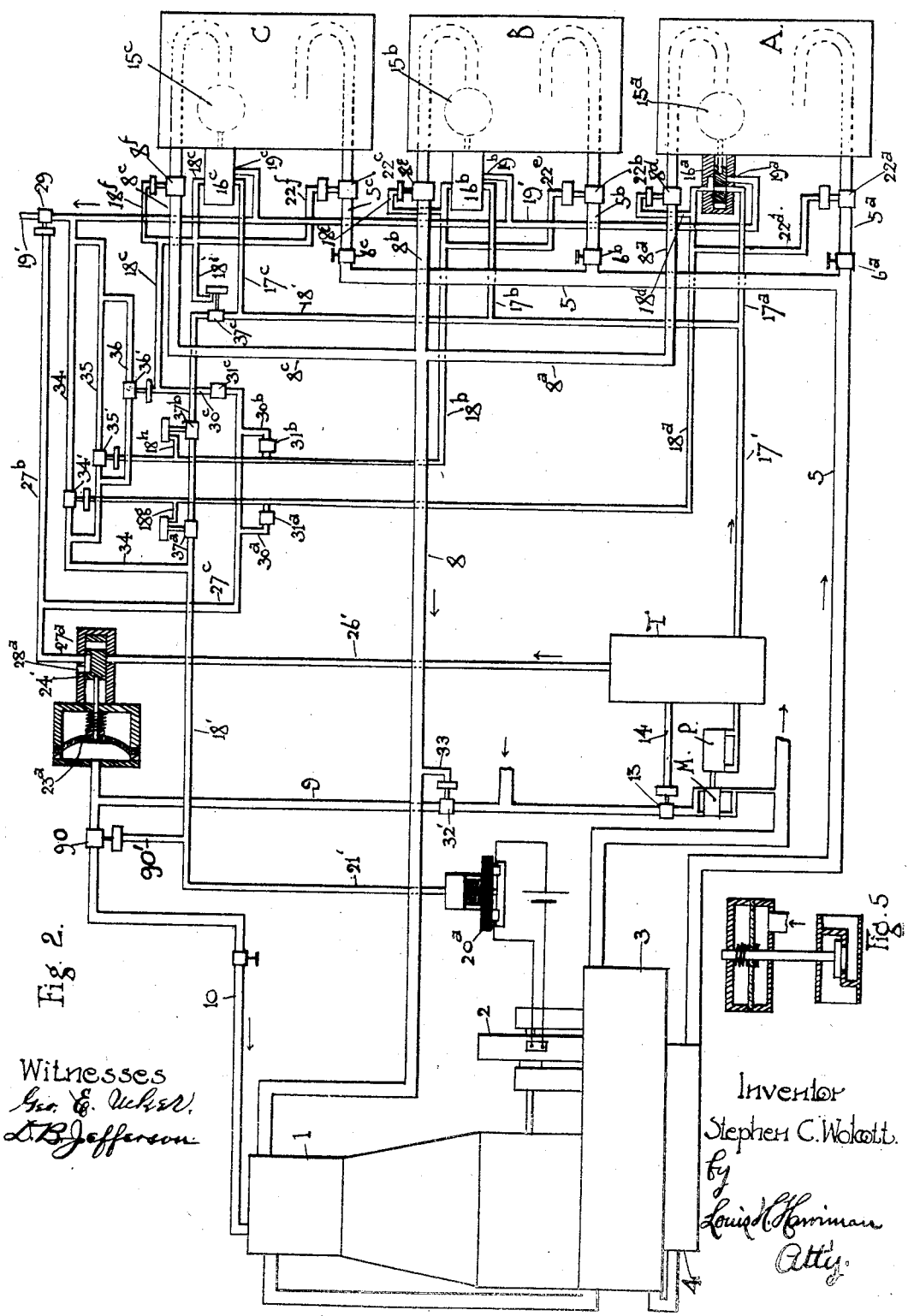

In the drawings, Figure 1 shows a diagrammatic view of my system applied to a single room of a refrigerating plant or single refrigerator or a single brine-tank in which it is desired to maintain a constant temperature. Fig. 2 shows my system applied to a plurality of rooms or brine-tanks in which it is desired to maintain the temperature at different points. Figs. 3, 4, and 5 are detail views.

This invention is adapted to be applied to the compression system of refrigeration only, and the apparatus which is used in this connection is the same as that which is commonly used for this purpose and forms no part of my invention. These parts are, however, indicated in a general way in the drawings, in which—

1 indicates the compressing-cylinders, which are driven by a motor 2.

3 is the condenser, and 4 the receiver, into which the condensed refrigerating liquid is passed prior to its being conducted to the refrigerating-coil. The particular refrigerating medium used is ammonia-gas. Other well-known compounds may also be used with equal advantage in my system. The refrigerating liquid is conducted to the expansion or refrigerating coil 7 by the pipe 5, passing through an expansion-valve 6, such valves being well known in the art. The discharge end of the coil is connected to the pipe 8, through which the expanded gas is returned to the compressing-cylinders 1. The water for cooling the refrigerating medium as it is compressed is conducted from the water-main 9 to the water-jacket of the compressing-cylinders by pipe and thence passes to the condenser 10 and is discharged into the sewer 11. The water-main is also connected to a hydraulic motor M by the pipe 12, said motor exhausting into the sewer 11. The motor drives an air-compressor P, which discharges into a compressed-air tank T. The pipe 12 is provided with an automatic diaphragm-valve 13, which is connected to the tank T by pipe 14, so that when the pressure in the tank is raised to a certain point the valve 13 will be closed, stopping the motor. The diaphragm-valve which is used in this instance and throughout the apparatus may be of any well-known form, one form of a valve of this character being indicated in Fig. 4. The stem of the valve is connected to a flexible diaphragm, which closes one side of the chamber. A pipe is connected to this chamber, through which the fluid may be supplied to force out the diaphragm and close the valve. A spring is also provided, which acts on the outer side of the diaphragm and will lift the valve from its seat when the pressure is removed from the diaphragm.

A thermostat 15 is located in the brine-tank or in the refrigerator. This thermostat may be of any well-known form which will reciprocate a valve-stem 15' in one direction or the other, according to the variations in the temperature in the refrigerator. This stem 15' is connected to a form of three-way valve 16, a simple form of such valve being shown in section in Fig. 1. The supply-port of said valve is connected to the compressed-air tank T by a pipe 17, and a pipe 18 is connected to the discharge-port of the valve. An exhaust-port 19 is also provided in the valve 16, which is open to the outside air. The water-supply pipe 10 to the compressor 1 is provided with a diaphragm-valve 90 of the same character as that shown in Fig. 4, and the pressure side of the diaphragm is connected to the pipe 18 by pipe 90'. A switch 20 is provided for making and breaking the circuit from the source of the electricity D to the motor 2. This switch is provided with two contact-points 20ª and 20ᵇ, which are supported on an insulating-block 20ᵈ. A cross-bar 20ᶜ is supported by a vertically-reciprocating stem 20ᵉ, said stem being connected at its upper end to a flexible diaphragm 20ᶠ. This diaphragm closes a chamber which is connected by a pipe 21 to the pipe 18. The under side of the diaphragm is supported by a spring, which is normally adapted to hold the cross-bar 20ᶜ in engagement with the contact-points 20ª and 20ᵇ, thus completing the circuit.

It is obvious that a rheostat could be advantageously substituted for the simple form of switch shown under many conditions. In fact, the rheostat is preferable under most conditions. As a rheostat is a form of "switch," the latter term is intended to include the former in the specification and claims.

A diaphragm-valve 22 is located in the pipe 5, which leads to the coil 7, between the expansion-valve and the coil, and a similar valve 8' is located in pipe 8 at the discharge end of the coil. The diaphragm-chamber of each valve is connected to pipe 18 by pipe 22'. Both valves close at a lower pressure than that necessary to stop the motor.

As thus far described the operation is as follows: Assuming that the thermostat will move the valve-stem 15' to the right when the temperature rises one degree above the normal or desired temperature and will move it to the left when the temperature falls one degree below the normal, it will be in the middle position shown in Fig. 1 when the compressor is being operated just fast enough to maintain the temperature at the desired point. If, however, the temperature should fall one degree or more below the normal, the valve-stem 15' of the thermostat will be moved to the left, so that the pipe 17 and the pipe 18 are connected through the ports of the valve 16. The compressed air from the tank will then flow through the pipe 18 and will first close the valves 8' and 22, preventing further discharge of the refrigerating medium into the coil 7 and exhaustion therefrom. The pressure in the pipe 21 will soon force down the contact-bar 20ᶜ, breaking the circuit and stopping the motor, and at the same time the pressure in the pipe 18 will pass through the pipe 90' and move the diaphragm in the valve 90, so as to shut off the water-supply through the pipe 10. All the parts will then be at rest until the temperature in the refrigerator is raised one degree above the normal. When this occurs, the thermostat will act to throw the valve 16 to the right and will close connection between pipes 17 and 18 and open the pipe 18 to the exhaust-port 19. The compressed air in the pipe 18 will then pass out through the port 19, relieving the pressure on the diaphragms of the switch 20 and of the valves 90, 8', and 22, permitting the springs under the diaphragms to act so that the bar 20ᶜ will be lifted, closing the circuit to the motor and starting the same and also opening valve 90, so as to supply water to the condensing-cylinders, and opening valves 22 and 8', so as to permit discharge of the refrigerating medium into and from the coil 7, the two latter valves opening last. By closing valve 8' in advance of the opening of the switch the pressure in the return-pipe 8 will be materially reduced before the motor stops, so that there will be a greatly-reduced load on the compressor and motor when they are started. This is an important feature, as the danger of burning out the electric motor is minimized.

In the case of the failure of the water-supply at any time I have provided an arrangement, hereinafter described, which will stop the motor, so that the condensing operation will not be continued unless the water is supplied to the condenser and compressor. A chamber 23 is provided, containing a diaphragm 23', which is connected to a three-way valve 24. The chamber 23 is connected to the pipe 10 by the pipe 25, and a spring 23'' acts to force the diaphragm against the water-pressure. Said chamber is located so that the water may drain therefrom into the compressor. A port on the upper side of the valve is connected to the pressure-tank T by a pipe 26, a pipe 27 is connected to a port in the lower side of the valve, and an additional port 28 is also provided adjacent said latter port, which is opened to the outside air. A diaphragm-valve 29 of the same character as those previously described is arranged in the pipe 18 between the points where the pipes 90', 21, and 22' are connected thereto and the valve 16, and the pipe 27 leads to the pressure side of the diaphragm of said valve. A pipe 30 connects the pipe 27 with the portion of pipe 18 which is on the side of valve 29 opposite valve 16, said pipe 30 being provided with a check-valve 31. The particular form of this check-valve is illustrated in Fig. 3, in which the valve 31 is guided by a stem $31^a$ and is held to its seat by a spring $31^b$. This valve is arranged in the pipe 30, so as to prevent flow from the pipe 18 to the pipe 27 and permit the flow of air from pipe 27 to pipe 18 when the pressure in pipe 27 is raised sufficiently to overcome the tension of the spring $31^b$. The tension of this spring $31^b$ is adjusted so that the valve 31 will not be opened until after the valve 29 is closed, when compressed air is forced into the pipe 27. The pressure side of the diaphragm 23' being constantly open to the water-pressure in the pipe 10, the valve 24 is normally held in the position shown in Fig. 1. If, however, the water-supply should fail or be turned off for any reason, the water would run out of the pipe 10 and chamber 23 into the compressor, and the pressure which forces the diaphragm 23' to the position shown in the drawings will be removed, so that the spring 23'' will act to move the valve 24 to the left, the tension thereof being just sufficient for this purpose. A free passage will then be opened from the pipe 26 to the pipe 27 through the valve 24. The air-pressure will pass from the tank T through the pipes 26 and 27 and will first close the valve 29, preventing the escape of the air through the pipe 18 and exhaust 19. The check-valve 31 will then be forced open, permitting the compressed air to pass into the pipes 90' and 22' and close the valves 90, 8', and 22 and also pass into the pipe 21 and open the switch 20, stopping the motor. When the water-supply is returned, the pressure will move the diaphragm 23' to the right, so that it will assume the position shown in Fig. 1 and will open a free escape from the pipe 27 to the open air. The check-valve 31' will close, and the valve 29 will be opened, so that a free escape of the compressed air in the pipes 21, 22', and 90' will be afforded through the pipe 18, removing the pressure from the diaphragms of valves 90, 8', and 22 and switch 20, thus opening said valves and starting the motor. As the chamber 23 is arranged so that it will drain into the condenser, the tension of spring 23'' should be very light, so that the mere presence of the water in the supply-pipe under a very low pressure will be sufficient to prevent the stopping of the motor.

In case the motor should burn out or the supply of electricity should fail I have provided a diaphragm-valve 32 in the water-supply pipe 9 to automatically cut off the water-supply. The diaphragm of the valve 32 is connected to the return-pipe 8 of the coil by pipe 33. It will be obvious that as soon as the compressor stops the valves thereof will prevent the escape of the refrigerating medium from pipe 8, so that the pressure will be raised in the latter by the continued discharge of the refrigerating medium from the coil to the highest point which will be permitted by valve 6. The diaphragm-valve 32 is adjusted so that under any ordinary or normal pressure it will not be closed by the return-pipe pressure; but when an excessive pressure is brought to bear thereon by reason of the sudden stoppage of the motor and compressor and consequent accumulation of pressure in the return-pipe the valve 32 will be closed, preventing waste of water. As the refrigerating medium cannot escape from the pipe 8, the pipe 9 will be kept closed until the compressor is again started, reducing the pressure in the pipe 8. A throttle-valve 10' is provided in pipe 10 between the valve 90 and the compressor to regulate the flow of water therethrough.

In Fig. 2 I have shown a system of regulation similar to the one previously described applied to a series of brine-tanks or rooms of a cold-storage plant, in each of which it is desired to maintain a difference in temperature. The condensing apparatus is precisely the same as that previously described with respect to Fig. 1. In this figure I have shown three separate refrigerating-chambers A, B, and C. The coils in these chambers (partially indicated by dotted lines) are connected to the main supply-pipe 5 by branches $5^a$ $5^b$ $5^c$. Each of these branch pipes is provided with expansion-valves $6^a$ $6^b$ $6^c$, said valves being adjusted according to the requirements of the refrigerating-chamber to which they are connected. The main return-pipe 8 is connected to the discharge ends of the coils by the branch pipes $8^a$ $8^b$ $8^c$, respectively. A constant pressure is maintained in tank T in the manner before described, and the diaphragm-chambers of the switch $20^a$ and the water-shut-off valves 90 are connected to the tank T by means of pipes 17' and 18' and their branches 21' and 90'. Thermostats $15^a$ $15^b$ $15^c$ (indicated in dotted lines) are arranged in chambers A B C, respectively, and these thermostats control valves $16^a$, $16^b$, and $16^c$, respectively, they being constructed the same as the thermostat 15 and valve 16 previously described in connection with Fig. 1. The supply-port of each valve is connected to the pipe 17', leading from tank T, by branch pipes $17^a$, $17^b$, and $17^c$. The ports $19^a$ $19^b$ $19^c$ from each valve are connected to the exhaust-pipe 19', the end of which is open to the atmosphere. Pipes 18ª 18ᵇ 18ᶜ are connected to the discharge-ports of valves 16ª 16ᵇ 16ᶜ, respectively. The supply and discharge ends of each coil are provided with diaphragm-valves 22ª 8ᵈ 22ᵇ 8ᵉ 22ᶜ 8ᶠ, respectively, and the pipes 18ª, 18ᵇ, and 18ᶜ are respectively connected to the diaphragm-chambers of said valves by means of pipes 18ᵈ 18ᵉ 18ᶠ 22ᵈ 22ᵉ 22ᶠ. The pipes 90' and 21' are connected to the exhaust-pipe 19ª by means of pipes 18' and 34. A diaphragm-valve 34' is arranged in said pipe 34, and the pipe 18ª is connected to the diaphragm-chamber of said valve. A by-pass pipe 35 is connected to pipe 34 on each side of valve 34', and a diaphragm-valve 35' is provided in said by-pass. The branch pipe 18ᵇ is connected to the diaphragm-chamber of valve 35'. In like manner a by-pass 36 is connected to the pipe 35 on opposite sides of the valve 35', and a valve 36' is arranged in said by-pass, pipe 18ᶜ being connected to the diaphragm-chamber of said valve 36'. Three diaphragm-valves 37ª 37ᵇ 37ᶜ are arranged in said pipe 18' beyond the point where the pipe 17ᶜ is connected with the branch pipe thereto. The diaphragm-chambers of said valves 37ª 37ᵇ 37ᶜ are respectively connected to the branch pipes 18ª 18ᵇ 18ᶜ by means of pipes 18ᵍ 18ʰ 18ⁱ. These latter-named valves act reversely to the diaphragm-valves which have been previously described, in that the chamber is on the side of the diaphragm which is next to the valve instead of being on the side opposite to the valve, so that when pressure is introduced in the diaphragm-chamber the valve will be lifted from its seat instead of being forced to its seat. The particular form of this valve is shown in detail in Fig. 5, the chamber on the side of the diaphragm being next the valve and its spring on the opposite side. The springs of these valves are adjusted so that a higher pressure is necessary to open these valves than to close valves 34' 35' 36' 8ᵈ 8ᵉ 8ᶠ. A three-way valve 24', which is practically the same in every respect as the valve 24 described in Fig. 1, is arranged in pipe 26', the latter being connected to the pressure-tank T. This valve is connected to a diaphragm 23ª, which is open to water-pressure from the supply-pipe 9 and is normally held in the position shown in the drawings. A pipe 27ª is connected to the discharge-port of valve 24', and said pipe is branched into two pipes 27ᵇ and 27ᶜ. The branch 27ᵇ is connected to the diaphragm-chamber of diaphragm-valve 29', which is arranged at the end of exhaust-pipe 19'. The branch 27ᶜ is connected to the pipes 18ª 18ᵇ 18ᶜ by the branches 30ª 30ᵇ 30ᶜ. Check-valves 31ª 31ᵇ 31ᶜ, similar to those shown in Fig. 3, are arranged in said pipes 30ª 30ᵇ 30ᶜ, respectively, said check-valves being arranged to prevent the flow of air from said pipes 18ª 18ᵇ 18ᶜ to pipe 27ᶜ.

The arrangement of the various pipes and valves and their connections having been described, the operation is as follows: I will assume for the sake of convenience that it is desired to maintain the chamber A at a temperature of 20°, B at a temperature of 30°, and C at a temperature of 40°. At the time of starting the valves 16ª 16ᵇ 16ᶜ will be in their right-hand position, so that the branch pipes 18ª 18ᵇ 18ᶜ will be open to the exhaust-pipe 19ª, the valves 37ª 37ᵇ 37ᶜ will be closed, and the valves 22ª 22ᵇ 22ᶜ 8ᵈ 8ᵉ 8ᶠ 34' 35' 36' will all be open. When the apparatus is started, the temperature in these chambers will be gradually reduced at the same rate until a temperature of 40° is reached in each chamber. When the temperature in the chamber C is reduced slightly below 40°, the thermostat 15ᶜ will move the valve 16ᶜ to the left, opening communication between the tank T and the branch pipe 18ᶜ through the pipe 17ᶜ. The pressure in the pipe 18ᶜ will immediately close the valves 22ᶜ, 8ᶠ, and 36' and open the valve 37ᶜ, valve 37ᶜ being opened after the other valves are closed. The pressure in chambers A and B will then be reduced to 30°, and when the thermostat 15ᵇ in the chamber B acts the branch pipe 18ᵇ will be connected to the pipe 17' and the valves 8ᵉ, 22ᵇ, and 35' will be closed and then the valve 37ᵇ will be opened. In like manner when the temperature in chamber A is brought to the point desired therein the thermostat will act to throw the valve 16ª so that the branch pipe 18ª will be connected to the tank T and the valves 22ª, 8ᵈ, and 34' will be closed and finally valve 37ª opened. By the opening of the valve 37ª the last obstruction to an open communication between the tank T and the pipes 21' and 90' is removed, so that the compressed air from the tank T may enter said pipes and open the switch 20 and stop the motor and close the valve 90 and stop the flow of water through the supply-main 10 to the compressor and condenser. By having the valves 34', 35', and 36' closed before valves 37ª 37ᵇ 37ᶜ are opened there is no chance for the compressed air to escape to the exhaust-pipe 19' after it passes the last valve 37ª.

It is desirable to have the capacity of the condensing apparatus such that it is amply able to maintain the desired temperatures in the several chambers to which it is connected, and in practice the condensing apparatus will be at rest a greater portion of the time. If, however, the temperature in any one of the chambers—say, for example, the chamber B—is raised above the normal, the action of the controlling apparatus will be as follows: The valve 16ᵇ will be moved to the right, so that the pipe 18ᵇ will be connected with the exhaust-pipe 19ᵇ, the pressure in the pipe 18ᵇ will be relieved, and the valves 37ᵇ will be first closed. Then the valves 35' and 22ᵇ will be opened, valve 37ᵇ shutting off the communication between the tank T and the diaphragm of the switch 20 and of valve 19ª. Upon valve 35' being opened a free passage for the compressed air in the pipes 21' 19" 18' will be afforded through the pipes 34 and 35 to the exhaust-pipe 19'. The removal of the pressure from the diaphragms of switch 20 and valve 90 will permit their springs to act and to close the switch and start the motor and compressor and open the water-supply to the compressor. The raising of the temperature in either of the other chambers above the normal will cause a similar operation, the communication between the tank T and pipes 90' and 21' being closed by the valve 37ᵇ or 37ᶜ and the communication between said pipe and the exhaust 19' being opened by the opening of the valve 34' or 36'. In case the water-supply should fail, so that the pressure on the diaphragm 23ᵃ is removed, the valve 24' will be shifted so that the pipe 27ᵃ will be placed in communication with the pipe 26, leading from the tank T, which will permit the pressure from the tank T to flow into said pipe 27ᵃ. The valve 29' is set so that it will close at a lower pressure than is required to open either of the check-valves 31ᵃ 31ᵇ 31ᶜ, so that valve 29' will first be closed, closing the outer end of the exhaust-pipe 19ᵃ. The air-pressure will then pass through the branch pipes 30ᵃ 30ᵇ 30ᶜ, closing valves 34' 35' 36' 8ᵈ 8ᵉ 8ᶠ 22ᵃ 22ᵇ 22ᶜ and then opening valves 37ᵃ 37ᵇ 37ᶜ, permitting the air-pressure from the tank T to pass around to the pipe 21' and open the switch 20, stopping the motor. The valve 90 will also be closed at the same time. When the water-supply is again turned on the diaphragm 23ᵃ will move the valve 24' so that the pipe 27ᵃ will be open to the exhaust-port 28ᵃ, thus permitting the valve 29' to open the end of the exhaust-pipe 19ᵃ. The temperature in each chamber will have risen so that their respective thermostats will have opened communication between pipes 18ᵃ 18ᵇ 18ᶜ and exhaust-pipe 19', so that as soon as valve 29' is opened the valves 34' 35' 36' 8ᵈ 8ᵉ 8ᶠ 22ᵃ 22ᵇ 22ᶜ will be permitted to open and the valves 37ᵃ 37ᵇ 37ᶜ will be closed, thus cutting off communication from tank T to pipe 18' and permitting the air in said pipe and pipes 21' and 90' to escape through pipes 34 35 36 and starting the apparatus. It will be apparent that the number of refrigerating-chambers may be thus increased indefinitely, it being simply necessary to provide an additional valve in the pipe 18' and an additional exhaust pipe and valve for each refrigerating-chamber and make the proper connections with the thermostat-valve and throttle-valve in the coil.

Although I have described the use of compressed air to operate the various controlling-valves referred to, yet any fluid under pressure will perform the same functions—for example, water under suitable pressure—but as water is slower to act than air I consider air preferable. A connection might also be made from the tank containing the refrigerating liquid to the compressed-air system, as indicated at X X' in dotted lines in Fig. 1, the pipe leading from the compressed-air tank being connected to the supply-pipe 5 and exhaust-pipe 19 being connected to the return-pipe 8 from the coil.

The particular forms of apparatus shown and described are not essentially parts of my invention, although some apparatus must be provided which will perform similar functions. For example, the various valves shown may be operated by a movable piston as well as a diaphragm, one being the equivalent of the other, and the fluid-pressure may be used to open the valves instead of a spring, and various other changes may be made which are within the scope of my invention.

Although I have described my invention in connection with the expansion system of refrigeration, it will be obvious that it may be used with equal advantage in connection with the brine system, in which a pump circulates brine, which has previously been reduced in temperature, through a series of coils. It will be obvious that if the latter system were employed in connection with my invention only the part thereof which relates to the controlling of the motor would be used.

Having described my invention, what I claim as new, and desire to secure by Letters Patent of the United States, is as follows:

1. A refrigerating apparatus comprising a compressor for compressing the refrigerating medium, a motor for operating said compressor, a water-supply pipe leading to said compressor, means for starting and stopping said motor and for controlling the passage of water through said pipe, a thermostat in said refrigerator, automatic fluid-pressure devices which are adapted to control the means for starting and stopping the motor and the passage of water through the supply-pipe, fluid-pressure pipes which are connected to said devices, and means controlled by said thermostat for supplying fluid-pressure to said fluid-pressure pipes.

2. A refrigerating apparatus comprising a compressor for compressing the refrigerating medium, a motor for operating said compressor, a water-supply pipe leading to said compressor for cooling said medium, means for controlling the starting and stopping of the motor, and for controlling the flow of water through said pipe, diaphragm-chambers having diaphragms therein, pipe connections between said chambers and a source of fluid-pressure supply, valve mechanism in said pipe connections which are adapted to control the supply and exhaust of fluid-pressure to said diaphragm-chambers, a thermostat arranged in said space to be refrigerated which is connected to and controls said valve mechanism and means for moving said diaphragms against the fluid-pressure and thereby operating the means for controlling the motor and the water-supply.

3. In a refrigerating apparatus, the combination of a compressor, a motor for operating the same, a circulating system, water-supply connections for cooling the refrigerating medium, means for starting and stopping the motor and for controlling the flow of water through said connections, diaphragm-chambers having diaphragms therein, connections between said controlling means for the motor and water-supply and said diaphragms, a fluid-pressure tank, means for maintaining a constant pressure therein, pipe connections between said tank and said diaphragm-chambers, a three-way valve in said pipe connections, means for moving said valve so as to open and close communication between said tank and chambers and for opening said chambers to an exhaust, said means comprising a thermostat which is arranged in the space to be refrigerated, and means for moving said diaphragms in the opposite direction from that which they are forced by the fluid-pressure.

4. A refrigerating apparatus comprising a compressor, a motor for driving the same, controlling means for said motor, a water-supply pipe for conducting water to the compressor to cool the refrigerating medium, an automatic valve for controlling the flow of water through said pipe, an expansion-coil which is located in the space to be refrigerated, connections between said coil and the compressor, an automatic valve in the inlet side of said coil, means, which are adapted to be operated by fluid-pressure, for operating said motor-controlling means and said automatic valves, a thermostat which is located in the space to be refrigerated, and means for controlling the flow of fluid-pressure to said operating means; whereby the motor may be stopped, the water-supply pipe to the coil be closed, and the supply of the refrigerant to the expansion-coil be shut off when the temperature falls below a predetermined point in the space to be refrigerated.

5. A refrigerating apparatus comprising a compressor, a refrigerating-chamber, an expansion-coil therein which is connected to the condensing apparatus, a motor for driving said compressor, means for controlling said motor which are adapted to be operated by fluid-pressure, a water-supply pipe for conducting water to the compressor, and means controlled by the water-pressure in said pipe for controlling the supply of fluid-pressure to said motor-controlling means.

6. In a refrigerating apparatus, the combination of a compressor, a motor for driving the same, a circulating system, water connections for cooling the refrigerating medium, means for controlling the starting and stopping of said motor, a flexible diaphragm connected to said controlling means, a chamber for said diaphragm, a system of pipes which are connected to said chamber, means for supplying fluid-pressure to said pipes, a valve for controlling the admission and discharge of fluid-pressure to said pipes, a diaphragm-chamber having a diaphragm which is connected to said valve, connections between said latter chamber and said water-supply connections, whereby the pressure of the water-supply will hold said valve in one position, means for moving said valve when the water-pressure is removed from said diaphragm, and means for moving said motor-controlling means when the fluid-pressure is removed from its diaphragm.

7. A means for maintaining different temperatures in a series of refrigerating-chambers, comprising a compressor, a motor for driving the same, an independent expansion-coil in each chamber, pipe connections between each of said coils and the compressor, a thermostat in each of said chambers, and means controlled by any one of said thermostats for stopping said motor when the temperature in each chamber has been lowered to the particular point desired therein, and for starting said motor when the temperature in any one of said chambers is raised above the desired temperature therein.

8. An apparatus for maintaining different temperatures in a series of refrigerating-chambers, comprising a compressor, a motor for driving the same, a series of refrigerating-chambers, an expansion-coil in each chamber each coil being connected to said compressor, means for automatically stopping said motor when the temperature in each chamber has been lowered to the particular point desired therein, and means for starting said motor when the temperature in any one of said chambers is raised above the desired temperature therein.

9. An apparatus for maintaining different temperatures in a series of refrigerating-chambers comprising a compressor, a motor for driving the same, an independent expansion-coil in each chamber each of which is connected to said compressor, a thermostat in each chamber which is adjusted according to the particular temperature to be maintained therein, automatic means for starting and stopping said motor which are adapted to be controlled by any one of said thermostats so as to stop the motor when the temperatures in each chamber have been reduced to predetermined points therein and to start the motor when the temperature in any one of said chambers is raised above the predetermined point of that particular chamber.

10. An apparatus for maintaining different temperatures in a series of refrigerating-chambers comprising a compressor, a motor for driving the same, a series of expansion-coils in each chamber, each of which is connected to said compressor, automatic means for preventing the temperature from being lowered below a certain point in one chamber and below a different point in another chamber, means for automatically stopping said motor when the temperatures in all of said chambers have been reduced to their various predetermined points, and means for automatically starting said motor when the temperature in any one of said chambers is raised to a predetermined point above its particular minimum temperature.

11. A refrigerating apparatus comprising a series of refrigerating-chambers, a motor, means driven thereby for cooling each of said chambers, automatic means for preventing the temperature from being lowered below a certain point in one chamber and below a different point in another, automatic means for stopping said motor when the temperatures in each chamber have been reduced to their respective points, and automatic means for starting said motor when the temperature in any one of said chambers has been raised to a predetermined point above the minimum temperature therein.

12. A refrigerating apparatus comprising a compressor, a motor for driving the same, means for controlling said motor, pipe connections for supplying water for cooling the refrigerating medium as it is condensed, an automatic valve in said water-supply pipe, a series of refrigerating-chambers having expansion-coils which are connected to said compressor, a thermostat in each chamber, automatic means for preventing the temperature from being lowered below a certain point in one chamber and below a different point in another chamber, automatic means for stopping said motor and water-supply when the temperature in each chamber has been lowered to the particular point desired, and automatic means for starting said motor and water-supply when the temperature in any one of said chambers is raised to a point above its minimum temperature.

13. A refrigerating apparatus comprising a series of refrigerating-chambers, a compressor, a motor operating said compressor, fluid-pressure-operated means for controlling said motor, a source of fluid-pressure, supply-pipe connections between the same and said motor-controlling means, a series of refrigerating-chambers having expansion-coils which are suitably connected to said compressor, a valve for each chamber in said supply-pipes, each valve being adapted to close communication between said pressure-supply and said controlling means, a series of exhaust-pipes, corresponding in number to said chambers, which are connected to said supply-pipes between said valves and the motor-controlling means, valves in each of said exhaust-pipes, a thermostat in each of said chambers, means controlled by the thermostat of each chamber which are adapted to open its corresponding valve in the pressure-supply and close its corresponding valve in the exhaust-pipes and vice versa.

14. A refrigerating apparatus comprising a series of refrigerating-chambers, a compressor, a motor therefor, means for controlling said motor comprising a pressure-diaphragm having a pressure-chamber on one side thereof, means for moving said diaphragm inwardly, a fluid-pressure-supplying tank, a supply-pipe connecting said tank and pressure-chamber, a series of valves in said pipe which correspond in number to the number of refrigerating-chambers, each valve being adapted to close communication between said tank and said motor-controlling means, a series of exhaust-pipes connected to said supply-pipe between said valves and said motor-controlling means, said exhaust-pipes corresponding in number to the number of refrigerating-chambers, a valve for closing each of said exhaust-pipes, diaphragm-chambers having diaphragms therein which are connected to each of said supply and exhaust pipe valves, fluid-pressure pipes which are connected to said chambers, said chambers being arranged so that when fluid-pressure is introduced therein the supply-pipe valves will be opened and the exhaust-pipe be closed, means for moving said valves in the opposite directions when the fluid-pressure is removed, a thermostat in each of said refrigerating-chambers, pipe connections between said supply-tank and the diaphragm-chambers of said exhaust and supply valves, and separate valve mechanisms controlled by each thermostat separately for opening and closing communication between the diaphragm-chambers of one of said supply-valves and one of said exhaust-valves.

15. A refrigerating apparatus comprising a compressor, means for driving the same, an expansion-coil in the chamber to be refrigerated, pipes which connect the ends of said coil to the compressor, a thermostat in said chamber, an automatic valve in the pipe which supplies the refrigerating medium to the coil which is adapted to be operated by fluid-pressure, and means controlled by said thermostat for controlling the supply and exhaust of fluid-pressure to said valve, said parts being arranged so that when the temperature in said chamber falls below a predetermined point said valve will be closed and will be opened when the temperature rises above a predetermined point.

16. A refrigerating apparatus comprising a compressor for compressing the refrigerating medium, a motor, an expansion-coil in the chamber to be refrigerated, supply and return pipes for connecting said coil with the compressor, means for controlling said motor which are adapted to be controlled by fluid-pressure, an automatic valve in said return-pipe which is also adapted to be controlled by fluid-pressure, said return-pipe valve being adapted to close at a lower pressure than is necessary to operate said motor-controlling means to stop the motor, a thermostat in said chamber, and means controlled by said thermostat for supplying fluid-pressure to said motor-controlling means and said valve, whereby said valve may first be closed and then the motor stopped.

17. A refrigerating apparatus comprising a compressor, a motor for driving the same, means for controlling said motor, an expansion-coil in the space to be refrigerated, supply and return pipes connecting said coil and the compressor, a valve which is adapted to close said return-pipe, a thermostat in the space to be refrigerated, and means controlled by said thermostat for operating said motor-controlling means and said valve, said means being adapted to close said valve before it acts to stop the motor.

18. A refrigerating apparatus comprising a compressor, a motor therefor, means for controlling said motor, pipe connections for supplying water to cool the refrigerating medium as it is condensed, a chamber having a diaphragm therein which is connected to said water-supply pipe and is arranged above the point where said pipe is connected to the condensing apparatus, means controlled by said diaphragm for operating said motor, said means being adapted to stop the motor when the water runs out of said chamber.

19. A refrigerating apparatus comprising a series of refrigerating-chambers, a compressor, a motor operating said compressor, fluid-pressure-operated means for controlling said motor, a source of fluid-pressure, supply-pipe connections between the same and said motor-controlling means, a series of refrigerating-chambers having expansion-coils which are suitably connected to said compressor, a valve for each chamber in said supply-pipes each valve being adapted to close communication between said pressure-supply and said controlling means, a series of exhaust-pipes, corresponding in number to said chambers, which are connected to said supply-pipes between said valves and the motor-controlling means, valves in each of said exhaust-pipes, a thermostat in each of said chambers, means controlled by the thermostat of each chamber which are adapted to open its corresponding valve in the pressure-supply and close its corresponding valve in the exhaust pipes and vice versa, said means being adapted to close said exhaust-pipe valves in advance of the opening of said supply-pipe valves.

In testimony whereof I have affixed my signature in presence of two witnesses.

STEPHEN C. WOLCOTT.

Witnesses:
LOUIS H. HARRIMAN,
GEO. E. UCKER.